United States Patent [19]
Arribart et al.

[11] Patent Number: 4,844,591  
[45] Date of Patent: Jul. 4, 1989

[54] VARIABLE TRANSMISSION GLAZINGS AND METHOD OF MAKING SAME

[75] Inventors: Herve Arribart, Soisy-Sous-Montmorency; Christian Padoy, Gonessee; Alain Dugast, Paris; Michel Armond, St. Marin D'Heres; Francis Defendini, Grenoble; Bernard Desbat, Pessac, all of France

[73] Assignee: Saint-Gobain Vitrage, Courbevoie, France

[21] Appl. No.: 69,467

[22] Filed: Jul. 2, 1987

[30] Foreign Application Priority Data

Jul. 4, 1986 [FR] France .................. 86 09733

[51] Int. Cl.$^4$ .................. G02F 1/01; G02F 1/17
[52] U.S. Cl. .................................. 350/357
[58] Field of Search .................. 350/357, 353, 355

[56] References Cited

U.S. PATENT DOCUMENTS

| | | | |
|---|---|---|---|
| 3,708,220 | 1/1973 | Meyers et al. | 350/160 R |
| 3,951,521 | 4/1976 | Findl | 350/357 |
| 4,220,514 | 9/1980 | Duchene et al. | 204/192 P |
| 4,278,329 | 7/1981 | Matsuhiro | 350/357 |
| 4,309,083 | 1/1982 | Duchene et al. | 350/357 |
| 4,338,000 | 7/1982 | Kamimori et al. | 350/357 |
| 4,465,339 | 8/1984 | Baucke et al. | 350/357 |
| 4,505,538 | 3/1985 | Toussaint | 350/357 |
| 4,573,768 | 3/1986 | Polak et al. | 350/357 |
| 4,630,893 | 12/1986 | Credelle | 350/334 |

FOREIGN PATENT DOCUMENTS

| | | |
|---|---|---|
| 00001955 | 5/1978 | European Pat. Off. . |
| 0028147 | 5/1981 | European Pat. Off. . |
| 20005856 | 4/1979 | United Kingdom . |

OTHER PUBLICATIONS

Giglia and Haacke, "Performance Improvements in WO$_3$-Based Electrochromic Displays", 23 Proceedings of the SID (1982), p. 41.

Siefert, "Properties of Thin In$_2$O$_3$ and SnO$_2$ Films Prepared By Corona Spray Pyrolysis and a Discussion of the Spray Pyrolysis Process", 121 Thin Solid Films (1984) pp. 275-282.

Rauh, R. David et al., "Materials for Electrochromic Windows", SPIE vol. 502 *Optical Materials Tech. for Energy Eff.* and Solar Energy Conversion, 1984, pp. 38-45.

Svensson et al., "Electrochromic Coatings for Smart Windows", SPIE vol. 502 *Optical Materials Tech for Energy Eff.* and Solar Energy Conversion, 1984, pp. 30-37.

*Primary Examiner*—Eugene R. LaRoche
*Assistant Examiner*—Nathan W. McCutcheon
*Attorney, Agent, or Firm*—Pennie & Edmonds

[57] ABSTRACT

The invention relates to coated glass substrates for obtaining a variable degree of light transmission therethrough. The coated substrate comprises successively, (1) a first transparent support plate, preferably formed of glass, (2) a transparent electroconductive layer, (3) a layer of an electrochromic material, (4) a proton conductive electrolytic layer having an organic polymer base, (4a) an optional counterelectrode layer, (5) a second electroconductive layer and (6) a second transparent support plate. A proton conductive polymer is selected for the electrolyte whose conductivity is greater than or equal to $$\frac{1}{10^5 \text{ ohm} \cdot \text{cm}}$$

wherein the layer has a thickness of less than 50 micrometers.

23 Claims, No Drawings

VARIABLE TRANSMISSION GLAZINGS AND METHOD OF MAKING SAME

FIELD OF THE INVENTION

The invention relates to coated glass substrates provided with an electrochromic coating and a process for producing these coated substrates. More precisely, the invention relates to coated glazings which permit a degree of deliberate control over the amount of thermal energy transmitted therethrough.

BACKGROUND OF THE INVENTION

For many years, those working in the glass art have attempted to solve the problem of reversible opacification as it applies to glazings. By "reversible opacification", applicants mean the process by which a transparent or semi-transparent glazing is rendered opaque and subsequently rendered at least partially transparent once again. The prior research efforts in this area have been directed to experiments dealing with various coating materials used to control the intensity or degree of the light radiation passing through the glazing.

One tangible result of these experiments is the so-called "photochromic" glasses which are currently marketed, particularly for the production of corrective eyewear. These glasses are at least partially opacified by the effect of ultraviolet radiation. Once the exposure to this radiation is terminated, however, they gradually revert to a transparent state.

Photochromic systems of this type are, however, described as "passive" in the sense that the user can not control by his actions the degree of opacification which the glass undergoes. Further, these photochromic glazings cannot be rendered opaque in a "low light" environment, such as that which is encountered outdoors at night. Clearly, therefore coatings of this type can not be utilized to bar all light from passing through the glazing.

In order to overcome these difficulties, efforts have been directed toward producing a "dynamic" variable transmission glazing, i.e., one wherein the degree of opacification may be deliberately controlled in any optical environment by the user. In this respect, the applicants have undertaken to investigate the field of electrochromic systems, wherein a color change may be intentionally obtained within a coated glazing due to the effect of an electric current passed through the coated substrate.

Electrochromic systems have previously been proposed for use, for example, in batteries, wherein their electrical properties are of interest, and in windows (i.e., glazings) wherein their optical properties have been investigated. The optical application for these materials is more particularly the object of the present application. In these optical applications, the system may be operated either in a reflection mode, wherein mirrors and alphanumeric display devices are required, or in a transmission mode, such as in the case of glazings utilized by the construction industry for installation in newly constructed buildings. It should be noted, however, that while, on the surface, systems utilizing the reflection and the transmission mode appear to be very similar, transmission glazings are subjected to far more rigorous demands than those utilizing the reflection process.

These requirements are detailed below and, until the development of the present invention, those working in this field had not been able to sufficiently overcome them to permit the development of a practical transmission glazing, even at the pilot plant level. In the following description applicants will disclose mainly electrochromic systems which function by transmission, with the understanding that nothing prevents the same materials and the same processes from being used for systems functioning by reflection.

The electrochromic systems designed by applicants and disclosed herein have overcome the difficulties previously encountered by others working in the field. The system comprises: two support plates, of glass for example, each coated with an electroconductive deposit acting as an electrode. The plates are separated by at least a layer of an electrochromic material and a layer of an electrolyte. The most frequently used electrochromic material is colorless tungsten oxide ($WO_3$) which becomes midnight blue in color, especially in the presence of protons.

Other electrochromic materials, particularly those with an iridium oxide base, form different colors when exposed to protons. When an electrochromic layer having a tungsten oxide base, which base constitutes an ion transfer layer, is used, numerous materials may be used as an electrolyte. None of these materials, however, have been determined to be fully satisfactory, at least for use in large electrochromic systems.

The first electrochromic systems were developed using a liquid electrolytic layer, which comprised a liquid solution of, for example, a strong acid. However, besides attacking the other layers almost immediately upon contact, these liquid electrolytes were further found to be very delicate to incorporate since their use requires very special care in the vicinity of the seals that insulate the system. In practice, therefore, these liquid electrolytes are used only for smaller electrochromic systems such as alphanumeric displays.

Systems known as "all solid" systems have also been previously proposed. These electrochromic systems may be classified as a function of the thickness of the electrolyte. Electrolytes which are deposited in "thick" layers, i.e., in thicknesses of generally more than 1 micron, for example, frequently utilize a base of mineral acids such as uranyl phosphoric acid. It has further been proposed to use liquid electrolytes of the polymer type for this purpose, particularly lithium salts buried in a porous medium. The main difficulties encountered in using these thick electrolyte layers are, however, (1) the appearance of diffraction zones which harm the optical quality of the glazing and (2) the toxicity inherent in the polymer electrolytes used, particularly salts of lithium, so that the large-scale use of this type of electrochromic glazing would be particularly burdensome.

Finally, there are "all solid" systems which utilize a "thin" electrolytic layer, measuring on the order of about 150 nanometers. Ion conductive glasses having this type of layer are often used. They comprise a thin dielectric layer of silica or magnesium fluoride, for example, doped with water molecules. This gives the layer a proton conductivity. These dielectrics are deposited under a vacuum, according to procedures well-known in the art and they are currently used to produce, for example, gold and silver glazings.

It has been observed by the applicants, however, that discontinuities appear within these "thin" layers as soon as the surface area to be coated exceeds about $10 \times 10$ cm$^2$. These discontinuities, which occur due to the very fine deposited thickness, lead to the formation of "holes or disruptions" in the coating. These holes may cause a short circuit, leading to an internal discharge of current within the device and a rapid spontaneous discoloration of the system.

SUMMARY OF THE INVENTION

In consideration of the drawbacks to the use of the prior art electrochromic systems mentioned above, applicants have now invented an electrochromic system which is relatively simple to operate in the transmission mode and which is provided with a continuous electrolytic layer. According to the invention, this electrolyte layer is a proton conductive layer formed with a proton polymer which is conductive at ambient temperature.

The invention has as an object the definition of criteria useful in selecting a proton conductive polymer for use in the invention. Applicants have determined, however, that the use of such an electrolyte does not permit an unlimited choice among all of the possible types of electroconductive layers and that these layers must meet stringent operating requirements.

The electrochromic system according to the invention comprises, in the order described, the following layers: (1) a first transparent substrate, preferably of glass, (2) a first transparent electrode (i.e., formed by a layer of an electroconductive substance), (3) a layer of an electrochromic material, (4) a proton conductive electrolyte comprising a film of an organic polymer, (4a) an optional counterelectrode layer (CE), (5) a second electroconductive layer and (6) a second transparent substrate. The electrolytic layer (i.e., layer (4) has, at 20° C., a proton conductivity greater than or equal to $$\frac{1}{10^5 \text{ ohm} \cdot \text{cm}}$$

and a thickness of less than 50 micrometers.

The electrochromic system according to the invention is thus characterized by the nature of its proton conductive electrolytic layer and, as shall be seen below, by the nature of the (optional) counterelectrode placed in contact with the electrolytic layer. For a layer thickness of less than 50 micrometers, which corresponds to the thicknesses of the layer in the so-called "thick" all-solid system, this electrolytic layer should exhibit a proton conductivity of at least $$\frac{1}{10^5 \text{ ohms} \cdot \text{cm}}$$

at 20° C. This degree of conductivity assures that the protons will be transferred with sufficient rapidity to facilitate the formation of a colored compound within the layer of electrochromic material, which serves to prevent the passage of the thermal energy.

It has also been determined by the applicants that the use of film-forming proton conductive polymers has definite advantages in the formulation of such an electrochromic system. Thus it is possible to prepare, under optimum conditions, films having the desired thickness and to mount these films according to well known techniques for the production of laminated glazings. The film thus obtained is resistant to manual tearing.

In addition to the film-forming capabilities of this material, its plasticity should be independently evaluated since it is this feature which makes it possible to assure good contact between the electrolytic layer and the other layers of the electrochromic system, as well as with the glass support plates. Preferably, this plasticity is maintained at a range similar to that adopted for plastic layers having a base of a PVB elastomer for use in laminated glazings, when maintained at a temperature of between about −20° and +60° C.

The electrolytic layer should also exhibit a strong bond to the other layers of the electrochromic system, particularly to metal oxide layers used to form the electrochromic layer and the electroconductive layers. Generally, the bond thus formed is satisfactory since the presence within the system of ions, particularly protons, contributes to the adherence of a polymer to the glass and to the other oxide layers.

Moreover, the proton conductive polymer undergoes crystallization at a low rate and this rate should not increase under the effect of either an electric field or solar radiation. A minimum attenuation of about 10% of the light transmission is thus tolerated for a glazing functioning in the transmission mode. In practice, this is achieved if the light transmission of the polymer film is greater than 85%.

With regard to the choice of proton conductive polymers suitable for use in the invention, those most particularly suitable are obtained by the addition of a strong acid to a solution of an organic polymer to obtain a complex which forms a solid solution.

DETAILED DESCRIPTIONS OF THE PREFERRED EMBODIMENTS

According to a first preferred embodiment of the invention, a phosphoric acid-polyvinyl alcohol polymer complex, prepared by the addition of a strong acid to a polymer solution in deionized water, is used to form the electrolyte. This complex is rather simple to use but it promotes corrosion and therefore tends to limit the useful life of the electrochromic system.

In a second, more preferred embodiment of the invention, a phosphoric acid-polyoxyethylene complex may be utilized. This complex is prepared under rigorously anhydrous conditions and is less likely than the phosphoric acid-polyvinyl polymer complex to oxidize the system.

In the embodiment described above, the phosphoric acid is preferably added in a concentration of 0.5 molecule per ethylene oxide monomer unit, i.e., with a ratio (O:H) of the number of oxygen atoms of the polymer to the number of hydrogen atoms of the acid between about 0.2 and 1 and preferably equal to 0.66. For such an O:H ratio, the proton conductivity and optical transparency are advantageously maximal.

In an alternate embodiment of the invention, a polyoxyethylene having a relatively high molecular weight, i.e., between about 1,000,000 and 5,000,000 and preferably closer to 5,000,000 is used, which minimizes the number of required hydroxyl groups, since these groups have been known to cause a degradation of the polymer.

In a further embodiment of the invention, the proton conductive film comprises a solid solution of a strong acid in a polyamide of the polyethyleneimine type, the strong acid being either sulfuric acid or phosphoric acid. Further, the proton conductivity at ambient temperature is advantageously greater than $$\frac{1}{10^4 \text{ ohm} \cdot \text{cm}}.$$

Such electroconductive organic polymers facilitate the construction of electrochromic systems produced with two layers of glass, optionally exhibiting a predetermined optical curve and equipped with a transparent electroconductive coating. One of the glass layers may further be provided with a layer of tungsten oxide deposited, for example, by cathode sputtering assisted by a magnetic field. The two glass layers and the polymer are assembled in an autoclave by a procedure well known in the art for making laminated glazings, particularly automobile safety windshields.

The electroconductive layer (5) and the optional, counterelectrode layer (CE) maybe subjected to a great deal of oxidation when positioned in contact with the electrolytic layer. Thus, if a metallic silver layer is used as the electroconductive layer, a rapid change in the metal is observed, with a concurrent yellowing of the electrolyte. At the conclusion of the reaction, the coloring is no longer homogeneous and the system progressively becomes unable to function in the transmission mode.

When other electroconductive layers having a minimal thickness are used, (e.g., a transparent, conductive layer of indium oxide deposited in a thickness of 50 nanometers by the well known technique of magnetron cathode sputtering) which exhibit a resistance of 200 ohms per square, a yellowing of the layer is observed which leads to a complete opacification of the system, or worse, to a total absence of color therein. Yet such a silver layer performs satisfactorially as an electrolyte in the presence of a dielectric.

According to the invention, the layer which is placed in contact with the electrolyte, i.e., the electroconductive layer (5) or the optional counterelectrode (CE), when one is present, should have a certain capability to insert a proton without altering the degree of light transmission obtained thereby. In this regard, satisfactory results have been obtained with a relatively thick electroconductive layer (5) formed of a metal oxide, which exhibits good electrical conductivity.

The resistance of this layer should be less than about 25 ohms per square and preferably less than about 8 ohms per square, while retaining a good transparency, i.e., with a light transmission factor in the visible spectrum greater than 82%. Some suitable layers include, for example, fluorine doped tin dioxide layers which are more than 350 nanometers thick or more preferably, a layer of indium oxide doped with tin oxide, which is more than 100 nanometers thick. Layers of indium oxide doped with tin oxide measuring more than 300 nanometers in thickness are more particularly preferred, however.

Preferably, the electroconductive layer is deposited by pyrolyzing a powdered form of indium and tin-based organic compounds or of tin compounds in the presence of a doping agent. The pyrolysis operation is preferably carried out on a glass sheet at a temperature of about 600° C. with a mixture comprising powders of indium formate, and at a maximum, 30% of a tin compound. The tin compound performs a cationic doping of the indium oxide and thus promotes its electric conductivity.

The electroconductive layers thus obtained exhibit a very slight resistance which may be further lowered by subjecting these layers to a thermal treatment in a reducing atmosphere. To obtain such layers, a powder with a base of indium formate, mixed with 4% by weight of dibutyltin oxide, distributed on a glass ribbon heated to 600° C. and passing the nozzle at 18 m/s is utilized as a starting material. By using a layer having a thickness of 300 nanometers, which may be obtained by suitably adjusting the flow of powder, a slightly green transmission layer is obtained whose resistance is 25 ohms per square and whose light transmission factor is about 85.8%.

Such electroconductive layers are stable in the presence of the oxidizing electrolytic layer. Further, a system prepared in this manner does not become colored, even after a great number of discoloring cycles over several hours. This latter property is very advantageous for making glazings for use in the construction industry because it is desirable in such an application to be able to deliberately opacify a glazing, or alternately, to permit it to remain totally transparent for an extended period.

In a further embodiment of the invention, the results are improved still more if the electroconductive layer is subjected to a heat treatment in a reducing medium, for example, by annealing under a nitrogen atmosphere, or by passing the system under a burner fed with an oxygen-hydrogen reducing mixture. As a result of such a treatment, the resistance of the layer discussed in the example above is lowered from 25 ohms per square to 7.6 ohms per square. The electroconductive layer thus formed suffers from less oxygen degredation, which thus makes it possible to produce an electrochromic system having a much longer life span. Additionally, in a large electrochromic transmission system, such as a window, a high degree of electrical conductivity is required in order to obtain a homogeneous and rapid coloring.

Such a metallic oxygen layer, particularly one formed of indium oxide, is very advantageous because it allows the formation of very transparent glazings having little or no coloring. Although their proton insertion capability is relatively average, it has also been found advantageous to dissociate the electrical conduction function and proton insertion function by inserting an optional counterelectrode (CE) layer formed of a material capable of inserting protons such as palladium and an electroconductive layer (5), positioned symmetrically with the first electroconductive layer.

EXAMPLES

The scope of the invention is further described in connection with the following examples which are set forth for purposes of illustration only and which are not to be construed as limiting the scope of the invention in any manner.

Applicants prepared an electrochromic system using, as an electrolyte layer, a polyvinyl alcohol-phosphoric acid polymer complex.

For this purpose, two square glass plates were prepared, measuring 5 cm on each side, and coated by powder pyrolysis with a 300 nanometer thick conductive layer comprising oxides of indium and tin. This conductive layer exhibited greater than 85% light transmission.

With the two plates described above, a system was prepared, comprising successively, (1) a first glass substrate, (2) a first transparent conductive layer, (3) a layer of tungsten oxide measuring 300 nanometers in thickness which was deposited by magnetron cathode sputtering from a metal target in the presence of an argon-oxygen gas mixture, (4) a film of a proton conductive polymer, about 10 microns in thickness, obtained by the evaporation of an aqueous solution of a polymer of polyvinyl alcohol and phosphoric acid, (5) a second transparent conductive layer and (6) a second glass substrate.

In the absence of an electrical current, the light transmission factor of such a system is 72%. In the presence of such a current, a blue coloring appears and the percentage of light transmission is lowered to 16%. This coloring persists after one hour.

Additional electrochromic systems were then prepared with an electrolytic layer formed with a polyoxyethylene-phosphoric acid complex.

Under rigorously anhydrous conditions, 2.25g. of phosphoric acid (of standard purity) and an amount of polyoxyethylene having a molecular mass of 5,000,000 (density 1.21, transition temperature −40° C.), wherein the O:H ratio of the number of oxygen atoms of the polymer to the number of hydrogen atoms of the acid was equal to 0.66, were mixed together in 75 milliliters of a common solvent, for example, a 50–50 mixture of acetonitrile and tetrahydrofuran. After pouring the mixture onto a glass plate and evaporating the solvent, a film having a thickness of from about 25 to about 50 micrometers was obtained whose conductivity at 20° C. was $$\frac{1}{10^5 \text{ ohm} \cdot \text{cm}}.$$

and whose light transmission was greater than 85%. This solid solution can also be prepared directly, in the absence of any solvent.

Such a polymer is transparent and does not readily crystalize, even after several days. It has an O:H ratio (as described above) varying between about 0.2 and 1.0. Under these conditions, the polymer actually has an essentially amorphous character. Further, the proton conductivity is greater than $$\frac{1}{10^5 \text{ ohm} \cdot \text{cm}}$$

for an O:H ratio between about 0.4 and 16. Therefore, according to the invention, polymers exhibiting an O:H ratio varying between 0.5 and 1 are suitable, the conductivity and transparency being maximum for an O:H ratio =0.66.

The molecular mass of the polyoxyethylene is advantageously selected to be between about 1,000,000 and 5,000,000. If a composition with too great a molecular mass is utilized, the rate of crystallization of the polymer becomes significant, which results in a loss of transparency. On the other hand, the use of short polymer chains leads to a proliferation of chain end hydroxyl units, which may lead to the degradation of the polymer.

In a further series of experiments, electrochromic cells were prepared comprising successively: (1) a first glass plate (2) a first electroconductive layer, (3) a tungsten oxide layer, (4) a proton conductive polymer film, (5) a second electroconductive layer and (6) a second glass plate. Two glass plates each coated with a transparent electroconductive layer were initially prepared with the Tungsten oxide layer being deposited on one of these plates by thermal evaporation or cathode sputtering. The cell was then assembled and sealed in an autoclave after being connected to both a voltage generator and a clock for measuring the duration of the coloring-discoloring cycle.

The first electrochromic cells constructed measured about 10×10 cm² and comprised an electroconductive layer formed from indium oxide, (resistance=5–6 ohms per square), a layer, 315 nanometers in thickness, of tungsten oxide and a film, 40 micrometers in thickness, of polyoxyethylene. The following values of light transmission were obtained:

| Electroconductive Layer (5) | Voltage: | $T_L$ MAX | $T_L$ MIN |
|---|---|---|---|
| $In_2O_3$ (6–8 ohms) | 2.5 volts | 77% | 35% |
| $In_2O_3$ (6–8 ohms) | 3 volts | 78% | 32% |
| $SnO_2$ (15 ohms) | 2.75 volts | 65.6% | 41% |

$T_L$ MAX represents the transmission of visible radiation in the system in the absence of an electrical field, whereas $T_L$ MIN is the minimal light transmission obtained after the cell becomes colored.

At values beyond 3 volts, the limits of the stability range of the electrolyte (which is between about 1 and 3 volts) is reached. For an electroconductive layer whose resistivity is slight, the coloring appears when the layer is subjected to a voltage greater than or equal to 2.5 volts. The light transmission differential is greater, the higher this voltage becomes. With a layer that has a relatively poorer degree of conductivity, the light transmission differential is much smaller. Further, a voltage of 2.75 volts is necessary for the coloring phenomenon to appear.

Thus, by working with very conductive layers, a more intense coloring may be obtained, which can further be made to vary by modifying the applied voltage. The intensity of the coloring also depends on the thickness chosen for the layer of electrochromic material as shown by the tests below which were performed on cells exhibiting the following common characteristics:

the electroconductive layer (2) comprised doped indium oxide (resistance =5–6 ohms per square), the electrochromic layer (3) comprised tungsten oxide of variable thickness, the electrolytic layer (4) comprised a polyethylene oxide polymer, (40 micrometers), the electroconductive layer (5) comprised doped indium oxide (resistance=6–8 ohms per square), voltage applied to the system: 3 volts, surface of sample 65–95 cm².

| $WO_3$ Thickness | $T_E$ MAX | GAIN |
|---|---|---|
| 315 nm | 49.5 | −28.4 |
| 380 nm | 49.2 | −37.2 |
| 390 nm | 62.2 | −42.5 |
| 720 nm | 57.2 | −32.3 |

$T_E$ MAX indicates (in %) the maximum energy transmission of the system. The third column indicates the gain obtained after the system becomes colored (the negative values obtained for this parameter demonstrate that the energy transmission after the coating becomes colored would, of course, be lower than the original transmission value).

The energy transmission gain is particularly advantageous for glazings functioning in the transmission mode. This value reflects the efficiency of the glazing which would be useful in determining, for example, the air conditioning requirements for a new building.

Between 315 and 390 nanometers, an increasingly large (in absolute value) gain is observed. On the other hand, for a greater thickness, e.g., 720 nanometers, a lower amount of gain was observed, which may perhaps be explained as being due to poor electronic conduction. Better results are obtained with tungsten oxide layers of a thickness about 350–400 nanometers.

Such electrochromic transmission systems can be used to construct glazings, the coloring and intensity of which are proportional to the intensity of the applied electric field. Thus, the intensity of this field may be controlled, for example, section by section or by a solar radiation intensity sensor, for better thermal comfort.

These systems also have applications in the field of automobile glazings, particularly for use in side or rear windows, to improve the thermal comfort of the passengers during the summer period. Further, by applying a metal plate to the back face of the system (i.e., glass plate (6)), a rear-view mirror is obtained.

Finally, it is possible to achieve semitransparent systems that can be used as automobile sun roofs. Such systems are advantageously obtained by inserting between electrolytic layer (6) and transparent conductive layer (5) a layer of palladium deposited, for example, by a thermal evaporation technique. Advantageously, the palladium makes it possible to lower the coloring voltage to between 1.5 and 2 volts, which is close to the stability optimum for polyethylene oxide. The palladium thus actually promotes the electronic transfers. Further, the palladium is a proton acceptor and plays a role similar to that of the electrochromic material layer but without becoming colored.

A semireflecting system having the following layers has been achieved by following the process indicated above:

an electroconductive layer (2): of indium oxide, with a resistance of about 5–6 ohms per square, an electrochromic layer (3): of tungsten oxide with a thickness of 300 nanometers, an electrolytic layer (4): of polyoxyethylene with a thickness of 40 micrometers, a palladium layer with a thickness of 15 nanometers, an electroconductive layer (5): of indium oxide with a resistance of 6–8 ohms per square.

The light transmission of such a system is 15% while the system is transparent and practically 0% after coloring. Further, the electric performances remain unchanged after 250 cycles under a voltage of 1.5 volts.

While it is apparent that the invention herein disclosed is well calculated to fulfill the objectives stated above, it will be appreciated that numerous modifications and embodiments may be devised by those skilled in the art, and it is intended that the appended claims cover all such modifications and embodiments as fall within the true spirit and scope of the present invention.

We claim:

1. A coated laminate comprising, in succession:
   (a) a first transparent substrate;
   (b) a first layer of an electroconductive substance;
   (c) a layer of an electrochromic material;
   (d) an electrolytic layer comprising a substantially anhydrous solid solution of phorphoric acid in polyoxyethylene;
   (e) a second layer of an electroconductive substance; and
   (f) a second transparent substrate,
   wherein at least a portion of each said layer b through e is positioned in an electrical contact relation with each adjacent layer to facilitate the passage therethrough of an electrical current.

2. The laminate of claim 1 which further comprises counterelectrode layer interposed between at least a portion of said electrolytic layer and at least a portion of said second layer of an electroconductive substance.

3. The laminate of claim 1 wherein said electrolytic layer has, at about 20° C., a proton conductivity greater than or equal to about $$\frac{1}{10^5 \text{ ohm} \cdot \text{cm}},$$

when said electrolyte is present in a thickness of less than about 50 micrometers.

4. The laminate of claim 1 wherein said solid solution of phosphoric acid in a polyoxyethylene polymer is film-forming.

5. The laminate of claim 1 wherein said polyoxyethylene is in a substantially amorphous phase.

6. The laminate of claim 1 wherein a ratio of the number of oxygen atoms in the polyoxyethylene to the number of hydrogen atoms in the acid is between about 0.4–1.

7. The laminate of claim 6 wherein said ratio is between about 0.6 and 0.7.

8. The laminate of claim 1 wherein said polyoxyethylene polymer has a molecular mass of between about 1,000,000 and 5,000,000.

9. The laminate of claim 1 wherein said electrochromic material is tungsten oxide.

10. A coated optical glazing comprising in succession:
   (a) a first glass plate;
   (b) a first transparent electrode, said first electrode comprising a layer of a first electroconductive substance;
   (c) a layer of tungsten oxide;
   (d) a substantially anhydrous layer of a polyoxyethylene film;
   (e) a second transparent electrode, said second electrode comprising a layer of a second electro-conductive substance, which second substance may be the same as or different than said first electroconductive substance; and
   (f) a second glass plate,
   wherein at least a portion of each said layer b through e is positioned in an electrical contact relation with each adjacent layer to facilitate the passage therethrough of an electrical current.

11. The glazing of claim 10 which further comprises counterelectrode layer interposed between at least a portion of said polyoxyethylene film and at least a portion of said second transparent electrode.

12. The glazing of claim 10 wherein said layer of said second electroconductive substance comprises a layer of tin oxide doped with fluorine.

13. The glazing of claim 12 wherein said electroconductive layer has a thickness of greater than about 350 nanometers.

14. The glazing of claim 10 wherein said layer of said second electroconductive substance comprises a layer of indium oxide doped with tin oxide.

15. The glazing of claim 11 wherein said counterelectrode layer is a material capable of adding protons to an adjacent layer without affecting the amount of light transmitted through said glazing.

16. The glazing of claim 15 wherein said proton-adding material is palladium.

17. A variable light transmission glazing comprising, in succession:
 (a) a first glass plate;
 (b) a first electroconductive layer of indium oxide doped with tin oxide, said first electroconductive layer measuring about 300 nanometers in thickness;
 (c) a layer of tungsten oxide;
 (d) a substantially anhydrous layer of a polyoxyethylene film having a proton conductivity at about $\frac{1}{10^5 \text{ ohm} \cdot \text{cm}}$;
 (e) a second electroconductive layer of indium oxide doped with tin oxide, said second electroconductive layer measuring about 300 nanometers in thickness; and
 (f) a second glass plate,
 where at least a portion of each said layer b through e is positioned in an electrical contact relation with each adjacent layer to facilitate the passage therethrough of an electrical current.

18. A process for forming the glazing of claim 10 wherein said polyoxyethylene film is prepared by reacting, under substantially anhydrous conditions, a predetermined amount of phosphoric acid with a predetermined amount of polyoxyethylene in a substantially nonaqueous solvent to form a film of said polyoxyethylene.

19. The process of claim 18 which further comprises mixing substantially equal amounts of acetonitrile and tetrahydrofuran in order to form said substantially nonaqueous solvent.

20. The process of claim 18 wherein at least said layer of said second electroconductive substance is obtained by pyrolyzing an indium formate powder in the presence of a compound containing tin at a temperature of about 600° C. upon at least a portion of said glass plate located adjacent thereto.

21. The process of claim 20 which further comprises heat-treating at least said layer of said second electroconductive substance in a reducing medium to reduce the resistivity of said layer.

22. The process of claim 20 wherein at least said layer of said second electroconductive substance is deposited by cathode sputtering wherein said sputtering is assisted by a magnetic field.

23. A glass laminate comprising:
 a pair of glass sheets in parallel spaced relation, an inner surface of each sheet having applied thereto a layer of a conductive metal oxide coating covering at least a portion of said surface; and
 an electrochromic laminate comprising a layer of an electrolytic material and a layer of an electrochromic material in electrical contact with said electrolytic material, said electrolytic material comprising a substantially anhydrous solid solution of phosphoric acid in polyoxyethylene;
 wherein said electrochromic laminate is placed between said conductive metal oxide layers and in electrical contact therewith to provide a conductive path for current flow between said glass sheets; and
 said electrolytic material is capable of transferring protons between one of said electroconductive layers and said electrochromic material; and further wherein said electrochromic material is capable of changing color upon passage of protons therethrough.

* * * * *